United States Patent [19]

Kenyon

[11] 3,858,060

[45] Dec. 31, 1974

[54] INTEGRATED DRIVER CIRCUIT

[75] Inventor: Richard Arthur Kenyon, Underhill, Vt.

[73] Assignee: International Business Machines Corporation, Armonk, N.Y.

[22] Filed: June 7, 1973

[21] Appl. No.: 368,002

[52] U.S. Cl. .................. 307/270, 307/238, 307/279, 307/304, 340/173 R, 357/41, 357/45

[51] Int. Cl. .......................... G11c 11/40, H03k 3/33

[58] Field of Search ........... 307/238, 242, 243, 270, 307/279, 304, 303; 340/173 R, 173 AM; 357/41, 45

[56] References Cited

UNITED STATES PATENTS

| | | | |
|---|---|---|---|
| 3,501,751 | 3/1970 | Gerrard | 307/242 X |
| 3,618,051 | 11/1971 | Oleksiak | 307/279 X |
| 3,702,990 | 11/1972 | Ross | 307/238 X |
| 3,749,942 | 7/1973 | Moses | 307/279 X |

OTHER PUBLICATIONS

Krick, "MNOS Electronically Alterable Read-Only Stores," IBM Tech. Discl. Bul., Vol. 13, No. 4, pp. 969–970, 9/1970.

*Primary Examiner*—Stanley D. Miller, Jr.
*Assistant Examiner*—L. N. Anagnos
*Attorney, Agent, or Firm*—Francis J. Thornton

[57] ABSTRACT

A driver circuit having two devices, each capable of sustaining a given voltage, is arranged to produce at the output of the two devices a differential voltage swing equal to substantially the sum of the voltages on each device. This driver circuit is especially advantageous when used with a memory array comprising a plurality of variable threshold semiconductor storage devices. The driver circuit can be isolated and built into the same monolithic substrate of semiconductor material as is the array. This isolation of the driver circuit permits the potential applied to the drive circuit substrate to vary, while maintaining a fixed potential on the array substrate so that large control voltages can be applied to the devices of the array through the driver circuit without affecting the devices of the driver circuit even when the voltage applied to the array exceeds the breakdown voltage of the devices used in the driver circuit.

5 Claims, 4 Drawing Figures

INTEGRATED DRIVER CIRCUIT

BACKGROUND OF THE INVENTION

The present invention relates to driver circuits especially useful when used with memory matrices using variable threshold devices as the memory storage elements. It is known that variable threshold, semiconductor field effect transistors which incorporate memories through the introduction of charges into a two-layer gate insulator can be produced and that these devices can be used as memory storage elements in large capacity random access memories and electronically alterable read only memories.

Typically, non-volatile field effect transistors are the metal/nitride/oxide/silicon (MNOS) field effect transistors. These devices have a two-layer gate insulator composed of a layer of silicon dioxide coated with a layer of silicon nitride. This two-layer gate insulator can store charge at the interface between the insulators which charge storage alters the threshold voltage of the device, that is, the voltage that must be applied to the gate to create a channel between the source and drain of the device. Typically, P channel MNOS devices have a threshold voltage of about −6 volts when there are no electrons stored at the interface and a threshold voltage of about −2 volts when electrons are stored therein. Such devices can be set into a selected state by applying large positive and negative voltages having a range of approximately 40 volts. A P channel variable threshold device can be put into a low threshold state; i.e., erased, by applying large positive voltages to the gate of the device to cause electrons to accumulate at the silicon nitride-silicon dioxide interface. The electrons so accumulated remain trapped at this interface when the applied voltage is removed and causes the device to exhibit a low threshold voltage. To write the charge device, large negative voltages must be applied to the gate to drive the electrons from the interface wherein they are trapped so that the device will again exhibit a high threshold voltage state.

Such charge accumulation is due to the different conductivities of the nitride and oxide layers and is retained at the interface between these layers when the applied voltage is removed because the current densities in the nitride and oxide layers are non-linear functions of the electric field intensity.

An electronically alterable read only memory is described in the IBM Technical Disclosure Bulletin, Volume 13, No. 4, September, 1970, Pages 969 and 970, in which each MNOS device is insulated from any other device by the medium of isolation diffusions held at a reference voltage.

U.S. Pat. No. 3,618,051 teaches that a word select address decoder can be junction isolated from the rest of the memory so that the substrates of all the memory transistors in the array can be held at different voltage levels from the voltage levels applied to the substrate of the decoder circuit.

U.S. Pat. No. 3,702,990 teaches that selected devices of an MNOS array can be placed in one threshold state by placing a gate electrode at a first voltage level and their semiconductor substrate at a second voltage level and that the second threshold voltage can be obtained by reversing the above mentioned voltages. Thus, the substrate of the memory array is switched to assume various voltage levels.

SUMMARY OF THE INVENTION

Broadly speaking, the present invention describes a novel drive circuit which can be used to supply voltage swing at its output, which voltage swing is in excess of the individual breakdown voltages used in the device. Such drivers can especially be used with a memory matrix using non-volatile, variable threshold transistors in an array organization.

More specifically, this driver circuit permits the array substrate to be held at a fixed reference voltage level at all times, and the substrate biasing levels of the associated driver circuits are switched, thereby permitting voltages to be applied to the array through the driver circuits for reading, writing, and erasing the array which voltages can be in excess of the breakdown voltages of the devices used in the driver circuits.

Still further, the unique driver circuit of the invention can, when isolated, be placed on the same monolithic body as the array and the drive circuit can have its substrate driven at a bias level different from that of the array substrate so that the large control voltage swings needed to erase or write the array which must be tolerated by the devices of the driver circuits of the prior art systems can be halved.

The present invention, when incorporated in an integrated structure, increases the density and the utility of the memory matrix.

It is also an object of the invention to describe a variable threshold memory matrix in which the substrate of the array is held at a fixed reference level during the read, write, and erase operations.

It is a further object of the invention to describe a variable threshold FET type memory matrix having an isolated driver circuit which can have applied through it, to the array, control voltages having levels in excess of the breakdown voltages of the devices of the driver circuit.

DESCRIPTION OF THE DRAWINGS

These and other features of the present invention will be more fully understood for the accompanying drawings in which.

DESCRIPTION OF THE INVENTION

Figure 1:
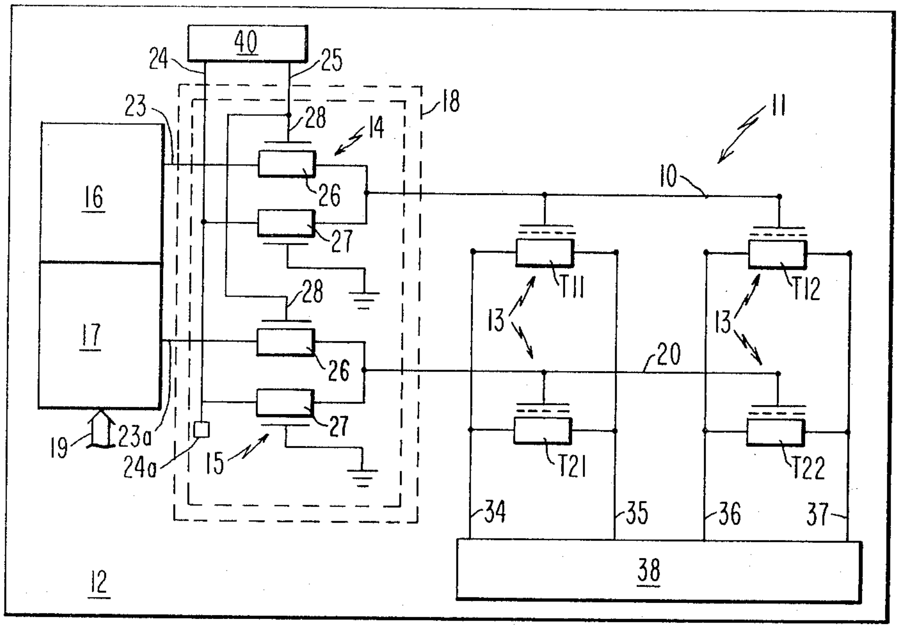
FIG. 1 is a schematic drawing of a memory matrix employing the present invention.

FIG. 1 shows schematically a word-organized memory array 11, formed in a monolithic semiconductor body 12, which can be used for an electronically alterable read only memory. The organization shown is for an array of two words, each containing two bits. The array 11 comprises two word lines, 10 and 20, each having two memory cells 13, coupled thereto. Also formed is the silicon body 12, by known techniques, are driver circuits 14 and 15, and decode circuits 16 and 17, each one respectively associated with each word line 10 and 20. Each drive circuit is situated adjacent to one end of a work line in the array 11, and between that work line and a decode circuit. The driver circuits 14 and 15 are isolated in a region of the body **12*a* by an isolation moat 18 which isolates in the region 12***a* from the remainder of the body 12 which contains the array and the decode circuitry. The peripheral area of the body 12 is used for required pads and bus connections to requisite circuits outside of the body 12.

Of course, it should be understood that the array 11 can have any desired number of work lines containing any number of bits therein, even though only two word lines 10 and 20, each containing but 2 bits, are shown in this embodiment.

Each word line 10 has one end thereof coupled to the isolated driver circuit 14, which is connected to the conventional decode circuit 16 by a write line 23. Word line 20 is similarly coupled to driver circuit 15, which in turn is connected to decode circuit 17 by write line 23*a*. Input address lines 19 are connected to the decode circuits 16 and 17.

For purposes of the present description and embodiment, it will be assumed that the non-volatile, variable threshold semiconductor field effect transistors, used in the array, utilize P channel operation and have an initial threshold voltage when no charge is stored at the dielectric interface of approximately −6 volts and a threshold voltage of approximately −2 volts when the interface contains a charge.

Figure 3:
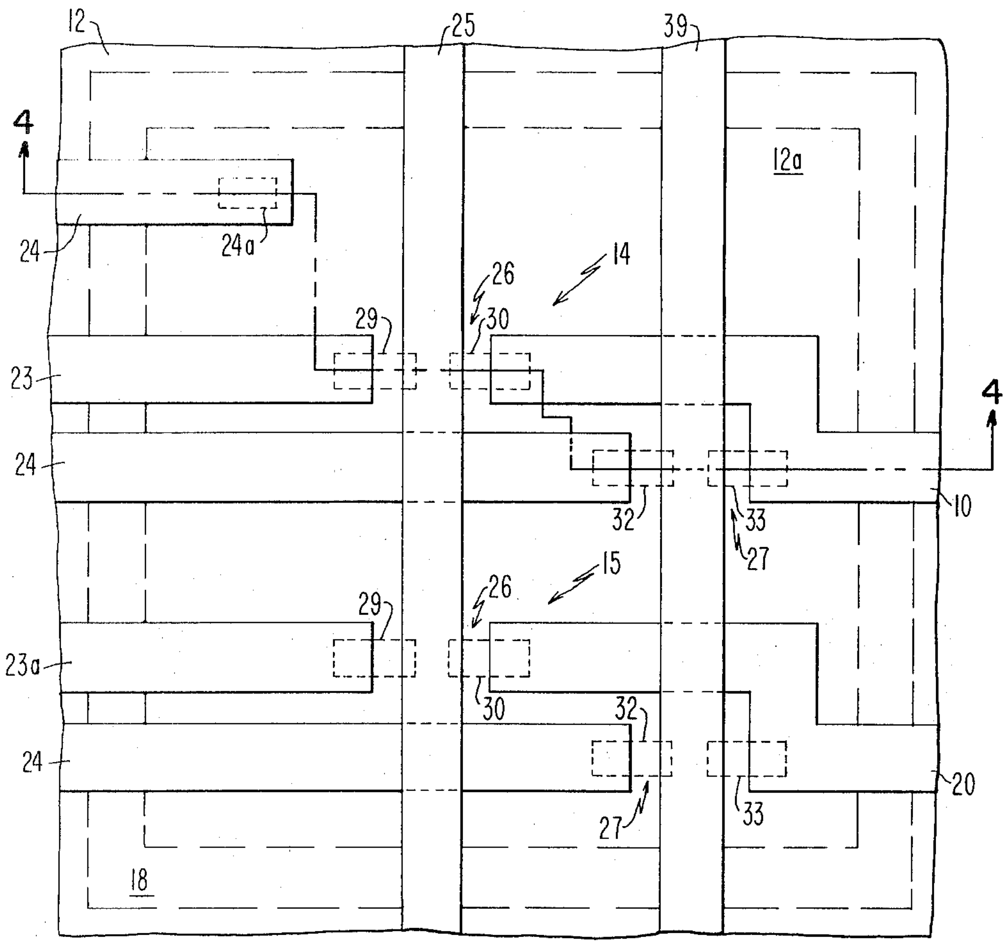
FIG. 3 is a plan view of an integrated form of the driver circuits of the invention.
Figure 4:
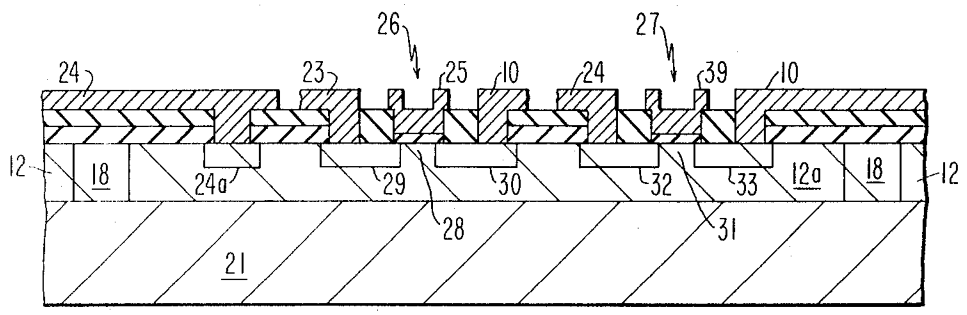
FIG. 4 is a sectional view of the integrated driver circuit shown in FIG. 3, taken along the line 4—4.

As shown in greater detail in FIGS. 3 and 4, the N-type body 12 is supported on a base 21 which can be, for example, a P-type semiconductor or an insulator such as sapphire. The isolation moat 18 can be formed by an oxidation process or by a P-type diffusion. The word driver circuits 14 and 15 each contain two FET's 26 and 27. Transistor 26 is formed of a drain diffusion 29 and a source diffusion 30, separated by a gate region 28 and transistor 27 is formed of a drain diffusion 32 and a source diffusion 33, separated by a gate region 31. The diffusions 29, 30, 32, and 33 are all P-type diffusions. To produce a good ohmic contact between the region 12*a* and the erase line 24, there can be provided a N-type diffusion 24*a*.

The erase line 24 is also connected to the drain diffusion 32 of FET 27 while the write line from the decode circuit is connected to the drain diffusion 29 of FET 26. The source diffusions 30 and 33 of both FET's 26 and 27 are both connected to the same word line. The inhibit line 25 acts as a gate electrode of transistor 26 and a ground line 39 acts as a gate electrode for transistor 27. This ground line 39 can also serve to maintain the isolation moat 18 and the body 12 at ground.

Both the erase line 24 and the inhibit line 25 are connected to a suitable voltage source 40 which can provide selectively to these lines both positive and negative voltage pulses as required.

A first plurality of memory cells 13, each comprising a non-volatile, variable threshold transistor T11 and T12, are coupled to the word line 10 by connecting the word line 10 to the gate of each transistor. A second plurality of similar transistors T21 and T22 are similarly coupled to word line 20. Transistors T11 and T21 are coupled between a pair of bit/sense lines 34 and 35 by connecting the pair of bit/sense lines to the respective source and drain electrodes of the transistors T11 and T12. Transistors T12 and T22 are similarly coupled between another pair of bit lines 36 and 37. Each bit/sense line 34, 35, 36, and 37 is connected at one end to a conventional bit line driver and sense amplifier 38.

For purposes of illustration only, the nonvolatile, variable threshold characteristic of these transistors is indicated in FIG. 1 by a dashed line between the gate and substrate of each transistor.

Figure 2:
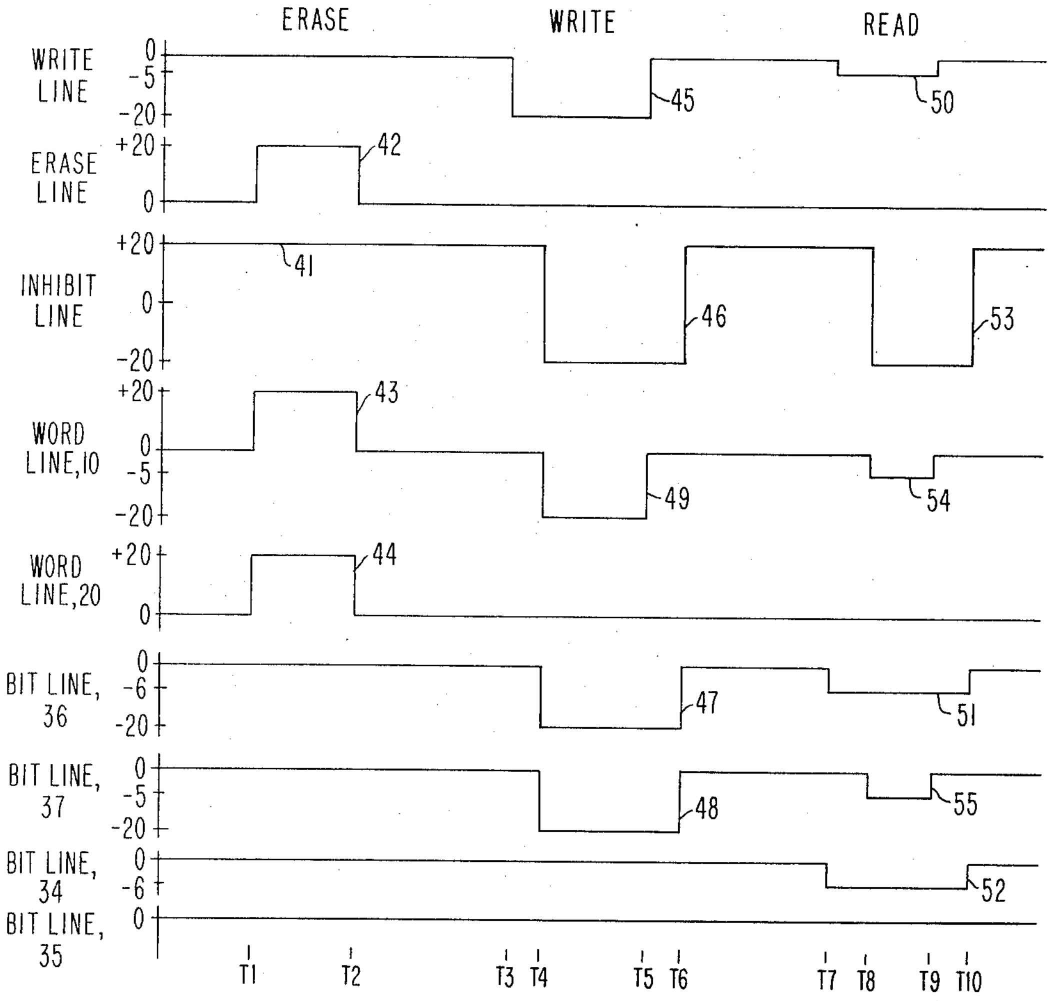
FIG. 2 shows the read, write, and erase waveforms associated with the circuits of FIG. 1.

In describing the operation of the memory matrix of the invention, reference will be made to FIG. 2. Also, it will be assumed for purposes of illustration only, that the low threshold state, that is, the charged state of a non-volatile transistor, will represent a binary 0, and the high threshold state, that is, the uncharged state of the non-volatile transistors in the array, will represent a binary 1. Initially, the entire two word, two bit array shown in FIG. 1 is erased such that the dielectric interface of each transistor in the array is charged and each transistor will exhibit a low threshold voltage. Once the entire array is erased, selected devices are written into and can be subsequently read to determine their state. It is these erase and write cycles that apply the large voltage swings to the variable threshold devices.

To erase the entire array, a positive twenty volt level 41 is maintained on the inhibit line 25 by source 40. At time T1, a twenty volt pulse 42 is applied to the erase line 24 from source 40. The write lines and the bit/-sense lines are maintained at ground or zero potential. The 20 volt positive pulse 42 on the erase line 24 drives the region 12*a* and the drain diffusion 32 of the FET 27 in each driver circuit 14 and 15 to +20 volts until it shuts off at time T2. Because the gate electrode 39 of the FET 27 is at ground, the transistors 27 conduct and the word lines 10 and 20 both go to +20 volts for the duration of pulse 41 as shown by pulses 43 and 44. By maintaining the inhibit line 25 at +20 volts, the FET 26 is prevented from conducting. Since the substrate 12*a* is connected to the erase line, it also goes to +20 volts and all the P-diffusions 29, 30, 32, and 33 remain either unbiased or back biased by only 20 volts during the duration of pulse 42.

The positive voltage pulses 43 and 44 on the respective word lines 10 and 20 cause any discharged transistor on these word lines to be charged. Thus, all the transistors T11, T12, T21, and T22 in the array 11 are at time T2 set into the binary 0 state. When the erase line 24 returns to ground, the word lines 10 and 20 both discharge to ground through the diffusions 30 and 33 which are now forward biased with respect to the substrate 12*a*. Binary 1's can now be selectively written into the array by discharging the dielectric interface of selected transistors so that the selected transistors will exhibit a high threshold voltage. For purposes of illustration only, it will be assumed that only transistor T11 is to have a 1 written into it and the remaining transistors will be left in 0 state.

To accomplish this, it will be assumed that at time T3 appropriate input signals are received via the address lines 19, to activate only the decode circuit 16. Activation of the decode circuit 16 applies a −20 volt write pulse 45 on line 23 and thus on the drain diffusion 29 of FET 26. At time T4, while write pulse 45 is still being applied to line 23, the inhibit line 25, and thus the gate of FET 26, has a −20 volt pulse 46 applied thereto by voltage source 40 and at time T4, the non-selected bit lines 36 and 37 also have −20 volt pulses 47 and 48 applied thereto by the bit line driver 38. The other bit lines 34 and 35 and the erase line 24 are held at ground potential. The application of the write line pulses and the inhibit pulses serves to turn on FET 26 in driver circuit 14 and causes the word line 10 to have a −20 volt pulse 49 applied thereto. This −20 volt pulse 49 on word line 10 causes electrons to be removed from the dielectric interface of transistor T11, setting it into the high threshold state. Charge becomes removed from transistor T11 because it alone experiences −20 volts across its gate dielectric. This voltage between the gate of the device and the body of the device causes electrons to be ejected from the gate dielectric of the device into the substrate 12*a*, increasing the threshold voltage of the device. Thus, the word line 10 for the described erase and write cycle experiences a total voltage swing of 40 volts, but the devices in the drive circuit never experience a voltage swing of greater than 20 volts. It should be noted that pulses 45, 46, and 47 can all be applied simultaneously or pulses 46 and 47 could be applied before pulse 45. Thus, the time differential between T3 and T4 is not critical as long as pulses 46 and 47 overlap pulse 45 for a time period sufficiently long enough to permit the selected transistor to be charged. It is necessary that pulses 42 and 45 not overlap for this condition could destroy the drive circuit devices by placing 40 volts across them. It is also desirable that pulse 46 not overlap pulse 42, since large power consumption will occur.

The remainder of the device in the array are, however, not written into either because, for example, transistors T12 and T21 have their gates, drains, and sources all at the same potential; or because, for example, transistor T22 has its gate held positive with respect to its source and drain.

After a time sufficient to assure that the selected device has been written into, i.e., at time T5, the decoder 16 is shut off and the write line 23 returned to ground potential. Since the inhibit line 25 is still at −20 volts, the FET 26 remains in a conductive condition and the word line 10 is discharged to ground potential through the FET 26. Thus, it is necessary that the pulse 46 remain on until time T6 to permit the word line 10 to return to ground potential. At time T6, the inhibit source 28, causing FET 26 to turn off, and the non-selected bit lines 36 and 37 are returned to ground.

After the selected devices have been written into, i.e., set into the high threshold state, the array can thereafter be read non-destructively. For purposes of illustration only, it will be assumed that word line 10 is to be read. Thus, the state of transistors T11 and T12 will be determined. This read cycle is initiated by introducing at time T7, appropriate read signals into the decoder circuit via the address lines 19 to cause the decoder circuit 10 to impress a −5 volt pulse 50 on the write line 23. Simultaneously, the bit/sense lines 34 and 36 have −6.0 volt pulses 51 and 52 applied thereto. All other lines are maintained at zero volts with the exception of the inhibit line 25, which is maintained at +20 volts.

At time T8, the inhibit line 25 is driven from +20 volts to −20 volts as shown by pulse 53. The application of pulse 53 to the gate of FET 26 causes the FET 26 to turn on the word line 10 to go to −5 volts as shown by pulse 54.

It is to be noted that this −5 volt pulse applied to the work line 10 being read is below the threshold voltage of uncharged devices and thus insufficient to turn on uncharged devices but more than sufficient to turn on devices that contain a charge. This low gate voltage applied to the word line 10 is also insufficient to introduce any change in the charged state of the transistors associated with that word line. Thus, when word line 10 becomes biased at −5 volts, only the charged devices on that word line turn on.

In the described example, only transistor T11 on word line 10 has been discharged and thus it alone stays off. Thus, only transistor T12 turns on and creates a conductive path between bit line 36 which is at about −6.0 volts and bit line 37 which is at 0 volts. This conduction of transistor T12 causes bit line 37 to go to approximately −5 volts as shown by pulse 55. This indicates that transistor T12 stored a binary 0. Although transistor T11 also has a −5 volt pulse applied to its gate it does not turn on because it is in a high threshold state. Therefore, no conduction path is created between the bit lines 34 and 35 and bit line 35 remains at zero volts indicating that transistor T11 is storing a binary 1.

Since the transistors T11, T12, T21, and T22 are non-volatile, variable threshold devices, and since the applied word line voltage of −5 volts is insufficient to affect the charge state of the devices, each device maintains its original charge state upon the termination of pulse 53. Because decoder 17 was not turned on, word line 20 was held at 0 volts and the transistors T21 and T22 coupled to it, are in no way affected by the application of any voltage to the bit lines.

At time T9, the write line voltage can be reset to ground by shutting off decoder circuit 16. Because pulse 53 remains at −20 volts, the FET 26 remains conductive and the word line 10 is discharged through the FET 26 to ground. When the work line 10 is again at ground potential, transistor T12 shuts off and pulse 55 terminates. At time T10, the inhibit line 25 is again raised to +20 volts to terminate pulse 53 and the bit lines 34 and 36 are also returned to ground potential. It should be noted that pulse 53 could be driven to −20 volts before or simultaneously with the application of the read pulse 50 to the write line 23. However, it is necessary that this inhibit line 25 remain at −20 volts for a period of time after the write line 23 has been returned to ground to assure that the word line 10 also is discharged to ground potential.

The described driver circuit is unique compared with previous known arrangements because by utilizing the structure and concepts of the present invention it is now possible, especially in non-volatile, variable threshold memory arrays, to apply a large voltage swing e.g., 40 volts to a selected word line of the array to set the charged state of the variable threshold devices of the array while maintaining the maximum voltage applied through the driver circuit at half the voltage swing of the word line, e.g., 20 volts. This is accomplished by isolating the driver circuit from the substrate in which the array structure is formed and by continuously maintaining the array structure substrate at ground voltage while driving the driver circuit substrate with respect to the erase line.

While the invention has been particularly shown and described with reference to the preferred embodiment hereof, it will be understood that those skilled in the art that various changes in form and details of the apparatus and method may be made therein without departing from the spirit and scope of the invention and that the method is in no way restricted by the apparatus.

What is claimed is:

1. A driver circuit comprising, a first device capable of sustaining a differential voltage of a first given value, means coupled to said first device for applying a first differential voltage of said first given value to said first device, a second device capable of sustaining a differential voltage of a second given value, means coupled to said second device for applying a second differential voltage of said second given value to said second device, said first and second devices each being coupled to a single output, means for selectively applying said first and second differential voltages to said first and second devices to produce at said output a differential voltage swing equal to the sum of the first and second voltages and additional means coupled to said second device for discharging said output.

2. The drive circuit of claim 1 wherein said first and second devices are transistors formed in a semiconductor body.

3. The driver circuit of claim 2 wherein said additional means for discharging said output includes means coupling said means for applying a differential voltage of said second given value to said semiconductor body.

4. The driver circuit of claim 1 wherein said first and second devices are field effect transistors having source and drain diffusions formed in a first portion of a semiconductor body, said means for applying a differential voltage of a second given value is coupled to said first portion of said body, said differential voltage of said first value being substantially equal in magnitude but opposite in polarity to said differential voltage of said second value and equal in magnitude to the breakdown voltage of said diffusions with respect to said first portion of said body.

5. The driver circuit of claim 4 wherein said output comprises the gate electrode of a third field effect transistor having source and drain diffusions formed in a second portion of said body, said first portion of said body is electrically isolated from said second portion of said body, and said second portion of said body is maintained at a fixed reference potential.

* * * * *